United States Patent [19]

Bettle

[11] 4,140,998
[45] Feb. 20, 1979

[54] HIGH ACCURACY POSITION INDICATOR
[75] Inventor: Richard E. Bettle, Rahway, N.J.
[73] Assignee: Sangamo Weston, Inc., Atlanta, Ga.
[21] Appl. No.: 666,720
[22] Filed: Mar. 15, 1976
[51] Int. Cl.² ............................................. G08C 19/08
[52] U.S. Cl. .................................... 340/199; 318/657; 323/51
[58] Field of Search ................... 324/34 PS, 34 D, 55, 324/200, 207, 208, 225, 226, 243; 318/657, 578; 340/199, 196; 323/51, 79; 321/24; 307/15; 325/385, 475; 328/161, 165; 363/74

[56] References Cited
U.S. PATENT DOCUMENTS

| 3,079,545 | 2/1963 | Kretsch et al. | 340/199 |
|---|---|---|---|
| 3,181,055 | 4/1965 | Bischof | 340/199 |
| 3,210,746 | 10/1965 | Clapp | 340/199 |
| 3,530,307 | 9/1970 | Evans et al. | 340/199 |
| 3,931,737 | 1/1976 | Conkling et al. | 340/199 |
| 3,939,389 | 2/1976 | Nopper | 318/657 |
| 3,956,741 | 5/1976 | Kraus | 340/199 |
| 3,976,894 | 8/1976 | Perkins et al. | 328/161 |

Primary Examiner—John W. Caldwell, Sr.
Assistant Examiner—James J. Groody
Attorney, Agent, or Firm—W. R. Sherman; Kevin McMahon; Edward Manzo

[57] ABSTRACT

A position indicator is disclosed which includes the combination of a linear voltage differential transformer (LVDT) and accuracy assurance circuitry. The LVDT includes a movable core connected to a mechanism whose position is to be indicated. The accuracy assurance circuitry permits the disclosed indicator to operate substantially independent of fluctuations in input voltage or frequency. This substantial independence is achieved in the following manner. First, the voltage across the LVDT is rectified by a first precision rectifier. Simultaneously, the LVDT tap voltage is rectified by a second precision rectifier. Each precision rectifier output is filtered and then applied to an analog divider which "cancels out" the effects of input voltage or frequency fluctuation. The divider output is an analog signal which is a true ratio of tap voltage to voltage across the LVDT. This true ratio signal accurately represents the position of the mechanism connected to the movable core.

9 Claims, 2 Drawing Figures

HIGH ACCURACY POSITION INDICATOR

BACKGROUND OF THE INVENTION

1. Field of the Invention

The invention relates to position indicators in general and more specifically to a highly accurate electronic position indicator utilizing a linear voltage differential transformer (LVDT) in combination with accuracy assurance circuitry.

2. Description of the Prior Art

There are numerous applications for position indicators. An example of one such application is in pressure sensing systems. Prior art position indicators employed in pressure sensing systems may be used to exemplify the problems inherent in prior art position indicators in general. Thus, for the purpose of illustration only, the discussion immediately following will focus on position indicators for pressure sensing systems.

Pressure sensing systems are known which employ a differential pressure transducer or a similar device to provide a mechanical movement which is a function of the pressure being measured. This mechanical movement is typically converted via mechanical means such as gears and levers or servo mechanisms to drive a meter calibrated in units of pressure. Using these devices for remote measuring of pressure, however, does give rise to certain problems. In the case of an entirely mechanical pressure sensing gage, accurate indication of pressure at a remote location requires long mechanical linkages or a fluid carrying line brought to the remote location of the gage. This approach, while accurate, is quite expensive to implement.

In the case of the servo mechanism approach, expense becomes a problem because of the high cost of servo mechanisms. In addition, servo mechanisms may be physically larger than is desired for a given application, such as in aircraft, and they usually require more electrical power than is desirable.

In attempting to overcome some of these difficulties, position indicators employing a LVDT have been used. These position indicators include a mechanical linkage between the movable core of the LVDT and a mechanical transducer whose movement is controlled by the item being measured, for example, pressure. The movement of the core is translated into a variable voltage at the LVDT tap and this voltage is used to indicate the core position. While this approach is considerably simpler and less costly than the above mentioned position indicators, the accuracy of the simple LVDT approach is often unacceptable. This is because the tap voltage is a direct function of the voltage applied across the LVDT and, therefore, is subject to variation should the supply voltage vary.

Other circuits have been developed in an attempt to provide accurate position indicators with a LVDT which are independent of the input voltage changes. One such approach employs a buckling coil on the transformer so as to minimize the effect of line voltage changes. This approach, however, wastes a great deal of power and, therefore, is not desirable. Other circuits utilizing reactive components have been developed. The accuracy of these circuits however, is dependent on maintaining a constant operating frequency on the AC power lines to the circuit. In certain applications, especially in aircraft, the on board AC power supply frequency is nominally 400 cycles but the actual frequency varies between about 380 and 420 cycles. As such, position indicators using circuits with reactive components have not been able to provide the desired accuracy in applications whose AC power frequency is subject to change.

In view of the foregoing difficulties associated with the prior art, it is an object of the invention to provide a position indicator which is substantially unaffected by changes in input voltage or frequency.

It is a further object of the invention to provide a highly accurate position indicator which may be operated with a minimum of power consumption and which occupies a minimal amount of physical space.

It is still a further object of the invention to provide a position indicator whose accuracy is substantially unaffected by changes in input voltage or frequency at a cost which compares favorably to known accurate approaches.

SUMMARY OF THE INVENTION

According to the present invention, accuracy assurance circuitry, including an analog divider, is used in combination with a LVDT in order to develop a true electrical ratio signal which accurately represents the position of the movable core included in the LVDT.

According to the preferred embodiment of the invention the voltage across the LVDT is rectified by a first precision rectifier. Simultaneously the LDVT tap voltage is rectified by a second precision rectifier. The voltage across the LVDT and the LVDT tap voltage are scaled by a voltage divider network prior to rectification whenever the maximum of these voltages is not compatable with the remainder of the position indicator circuitry. Next, the rectifier outputs are filtered and are finally applied to the analog divider in order to produce the true ratio of tap voltage to voltage across the LVDT.

The analog divider effectively "cancels out" the effects of input voltage or frequency fluctuation. Fluctuations in input voltage or frequency normally effect both the tap voltage and voltage across the LVDT proportionately. Thus, by utilizing the analog divider, the resultant true ratio signal is substantially independent of these fluctuations. The true ratio signal is therefore a highly accurate representation of the position of the mechanism connected to the movable core.

The analog divider output may be connected to a meter or other display device to provide an indication of the movable core position.

The invention features minimal power consumption, a relatively compact physical structure and high accuracy in the face of input voltage or frequency fluctuation.

BRIEF DESCRIPTION OF THE DRAWING

The foregoing and other objects and features of the invention will become more evident from the following detailed description taken in connection with the drawing which forms a part of the specification wherein.

DETAILED DESCRIPTION

Figure 1:
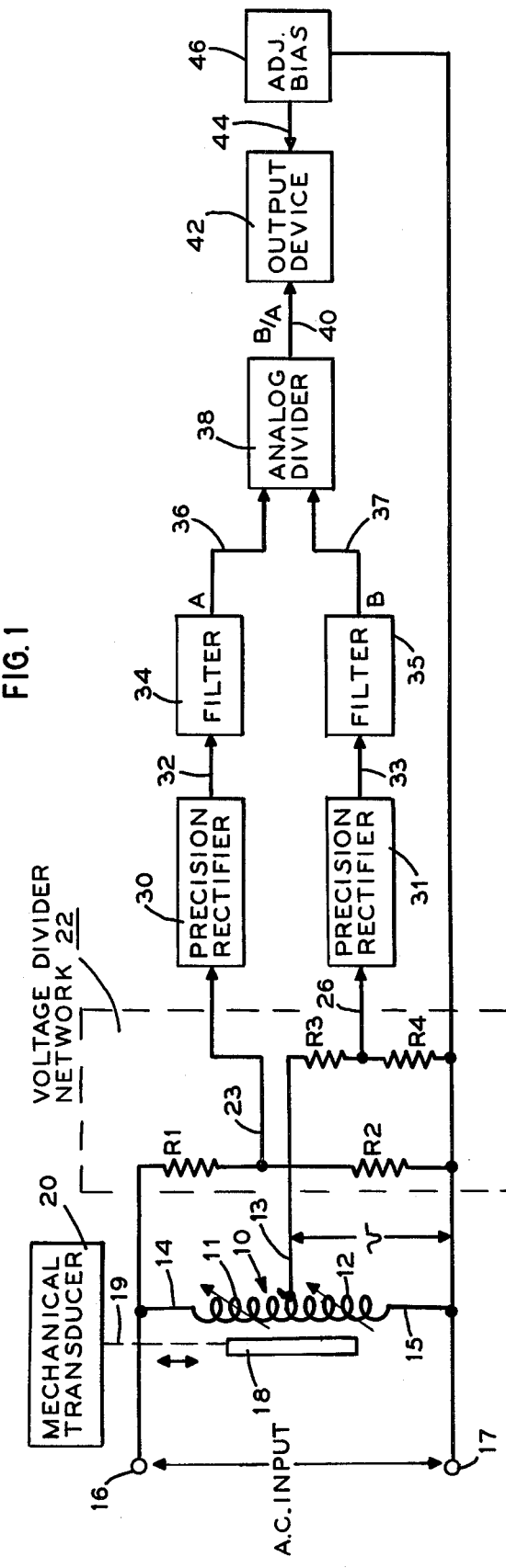
FIG. 1 is a schematic diagram illustrative of a high accuracy position indicator circuit built in accordance with the teachings of the present invention.

FIG. 1 displays an example of a high accuracy position indicator circuit built in accordance with the teachings of the present invention. For the sake of illustration only and without limiting the scope of the invention the disclosure is set forth in the context of a pressure sensing system.

Referring now to FIG. 1, the position indicator, according to the preferred embodiment, comprises a linear variable differential transformer (LVDT) 10 including two windings 11 and 12 series connected together at a tap 13 with the remaining winding connections 14 and 15 being connected across the input terminals 16 and 17 which are connected to an AC power source. The LVDT 10 has movable core 18 connected via a mechanical linkage 19 to a mechanical transducer 20 such as a differential pressure transducer or the like which responds to an external force such as pressure to produce a mechanical movement. The movement of the transducer 20 is transmitted via the mechanical linkage 19 to move the core 18 relative to the windings 11 and 12. In accordance with the well known operation of LVDT's, as the core 18 moves relative to windings 11 and 12, the voltage appearing between the tap 13 and the lead 15 varies and is related to the position of the core 18.

FIG. 1 further displays voltage divider network 22 connected across the input terminals 16 and 17. Voltage divider network 22 includes two series connected resistors R1 and R2. The resistance values for the resistors R1 and R2 are selected so that the voltage on lead 23, which is connected to the series connection point therebetween, is compatible with the remainder of the position indicator circuitry. The voltage at lead 23 is directly related to the voltage across the input terminals 16 and 17. If the remainder of the circuitry can operate at the full voltage appearing between terminals 16 and 17, the lead 23 can be connected to terminal 16 and the portion of divider 22 including R1 and R2 may be removed.

Voltage divider network 22 is further shown as including two series connected resistors R3 and R4 between the tap 13 and the input terminal 17. The resistance value for the resistors R3 and R4 is selected so that the voltage at the lead 26, connected to the series connection point between resistors R3 and R4, is compatible with the remainder of the position indicator circuitry. The voltage on lead 26 is directly related to the voltage between the tap 13 and input terminal 17 and, consequently, is related to the position of the core 18. If the remainder of the position indicator circuitry is compatible with the maximum voltage appearing at the tap 13, the lead 26 can be connected directly to the tap 13 and the portion of voltage divider 22 including R3 and R4 may be eliminated.

The leads 23 and 26 are respectively connected to precision rectifiers 30 and 31 which convert the alternating current signals appearing on leads 23 and 26 into direct current signals appearing respectively at leads 32 and 33. The direct current signals on leads 32 and 33 are then respectively filtered by the filter networks 34 and 35. As such, the signals on the output leads 36 and 37 respectively from filters 34 and 35 are DC signals having magnitudes respectively indicated by the letters A and B.

The precision rectifiers 30 and 31 each comprise a network for rectifying an input alternating current signal into a direct current signal whose amplitude is directly related to the amplitude of the input signal. A typical diode rectifier circuit is not preferred for this purpose because a voltage drop across each circuit diode (diode offset) and diode nonlinearity introduces a circuit loss which prevents the output voltage from being a direct function of the input voltage.

Figure 2:
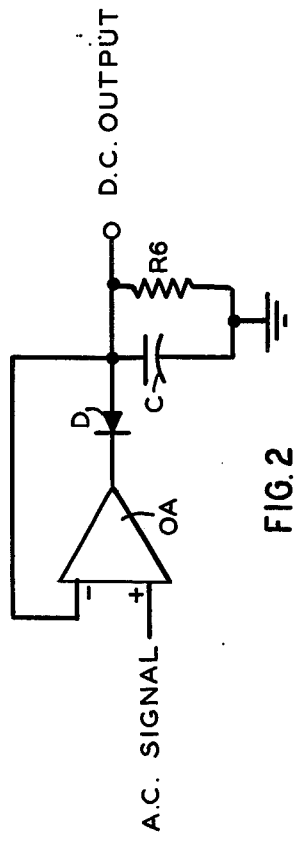
FIG. 2 is a schematic diagram showing one example of a precision rectifier and filter combination for use in the circuit of FIG. 1.

One precision rectifier circuit which overcomes the diode offset and diode nonlinearity problem comprises part of the circuitry shown in FIG. 2. This circuit includes an operational amplifier OA and a diode D wired with the noninverting input receiving the AC signal and with the output of the operational amplifier being connected via the diode D to its inverting input. This circuit arrangement of FIG. 2 with the capacitor C and the resistor R6 removed provides a halfwave rectifier whose output voltage is a direct function of its input voltage. The halfwave rectified signal, however, is filtered by a filter network, including the capacitor C and the bleeder resistor R6 connected across it, to produce a substantially pure direct current signal that is a direct function of the input alternating current signal to the precision rectifier.

In normal operation of the invention, the core 18 of the LVDT moves as the connected transducer 20 responds to varying conditions sensed thereby. The varying position of the core 18 causes varying DC signals A and B to appear respectively on leads 36 and 37. Each of these signals is applied to different inputs of analog divider circuit 38 which produces a ratio signal at its output whose amplitude is equal to the signal B divided by the signal A. In one application of the invention, the analog divider circuit 38 comprises an Intersil ICL 8013 although other analog divider circuits may be used to optimize the circuit for different applications.

FIG. 1 goes on to show output signal B/A of the analog divider circuit 38 connected via a lead 40 to an output device 42. Output device 42 may be a meter of the permanent magnet movement coil type or any other device for providing an indication of the signal magnitude on the lead 40.

The output device 42 is also shown connected via a lead 44 to an adjustable bias supply 46 which provides a signal to zero the reading of the output device 42. This is accomplished by allowing the core 18 to move to its "zero position", i.e., the position which indicates the quantity measured by the transducer 20 is zero. Then, the signal at the lead 44 from the adjustable bias supply 46 is changed until the reading on the output device 42 corresponds to zero.

In accordance with the operation of the illustrative example, as the mechanical transducer 20 responds to the external force measured thereby, the core 18 moves. This causes the signal at the tap 13 to change. Consequently, the signal B/A on the lead 40 changes thereby causing the indication on the output device 42 to change. The indication provided by the output device 42 is easily calibrated to directly indicate the quantity measured by mechanical transducer 20.

The accuracy provided by the output device 42, according to the invention, is independent of the amplitude of the AC signal supplied across input terminals 16 and 17. This is true because the voltage at the tap 13 of a LVDT is a constant percentage of the voltage applied across the series connected windings 11 and 12 so long as the core position remains constant. The remainder of the circuitry is substantially independent of any voltage changes at the input terminals 16 and 17 and therefore the voltage B divided by A which appears on lead 40 is substantially independent of voltage changes occurring at the input terminals 16 and 17.

The signal at the tap 13 is not affected by frequency deviations in the AC supply connected to terminals 16 and 17 since the voltage at taps 13 and 14 are in phase. In addition, the precision rectifier outputs on leads 32 and 33 are generally unaffected by frequency changes occurring in signals applied to the precision rectifier inputs. If the precision rectifiers are affected at all by frequency changes, the affect is proportional and is canceled out by the analog divider. The remainder of the circuitry operates in response to direct current signals which are not affected by changes in frequency of the input signal. As such the accuracy of output readings on device 42 is substantially unaffected by changes in the frequency of the AC source applied across the input terminals 16 and 17.

The foregoing description of the invention has been made with reference to one embodiment therefor. Those of ordinary skill in the art will recognize that modifications in addition to the modifications already suggested, may be made thereto without departing from the scope and spirit of the invention as defined in the claims. Accordingly, this invention is intended to be limited only by the scope and spirit of the appended claims.

What is claimed is:

1. A high accuracy position indicator for indicating the position of a mechanism comprising:
   (a) a linear voltage differential transformer including terminal means for receiving a first signal across said transformer, movable core means coupled to said mechanism for movement in correspondence therewith, and generating means for generating a second signal as a function of the position of said mechanism; and
   (b) accuracy assurance means coupled to said transformer for receiving said first and second signals, for providing a ratio signal as a function of the ratio of said first and second signals, said ratio signal being indicative of the position of said core independent of fluctuation in voltage or frequency of said first signal.

2. A high accuracy position indicator as set forth in claim 1 wherein said accuracy assurance means further comprises:
   (a) analog divider means for providing said ratio signal.

3. A high accuracy position indicator as set forth in claim 2 wherein said accuracy assurance means further comprises:
   (a) converter means, responsive to said first and second signals, for converting said first signal to a first DC signal, for converting said second signal to a second DC signal and for supplying said first and second DC signals to said analog divider means.

4. A high accuracy position indicator as set forth in claim 3 wherein said converter means comprises:
   (a) a first precision rectifier for generating a first rectifier signal in response to said first signal,
   (b) a second precision rectifier for generating a second rectified signal in response to said second signal,
   (c) a first filter, responsive to said first rectified signal, for generating said first DC signal; and
   (d) a second filter, responsive to said second rectified signal, for generating said second DC signal.

5. A high accuracy position indicator as set forth in claim 4 wherein said converter means comprises:
   (a) voltage divider means responsive to said first signal for generating a first scaled signal and responsive to said second signal for generating a second scaled signal wherein said first and second precision rectifiers are operative in response to said first and second scaled signals respectively, in place of said first and second signals.

6. A high accuracy position indicator for indicating the position of the mechanism comprising:
   (a) a linear voltage differential transformer including terminal means for receiving a first signal across said transformer, movable core means coupled to said mechanism for movement in correspondence therewith, and generating means for generating a second signal as a function of the position of said mechanism;
   (b) voltage divider means, responsive to said first signal to generate a first scaled signal and responsive to said second signal to generate a second scaled signal:
   (c) a first precision rectifier for generating a first rectified signal in response to said first scaled signal;
   (d) a second precision rectifier for generating a second rectified signal in response to said second scaled signal;
   (e) a first filter, responsive to said first rectified signal for generating a first DC signal;
   (f) a second filter, responsive to said second rectified signal for generating said second DC signal; and
   (g) analog divider means responsive to said first and second DC signals to produce an output ratio signal proportional to the second DC signal divided by said first DC signal wherein said output ratio signal is indicative of the position of the said core independent of fluctuation in the voltage or frequency of said first signal.

7. A high accuracy position indicator as said forth in claim 6 wherein each precision rectifier comprises:
   (a) an operational amplifier having an inverting and a non-inverting input and an output, wherein said non-inverting input is connected to said voltage divider means and wherein said output is coupled by diode to said inverting input.

8. A position indicator as said forth in claim 6 which further includes:
   (a) an output device responsive to said output ratio signal to produce an indication thereof which is a function of the position of said movable core.

9. A position indicator as set forth in claim 8 which further includes:
   (a) zero adjustment means coupled to said output device for biasing said device.

* * * * *